(12) United States Patent
Scoones et al.

(10) Patent No.: US 8,970,199 B2
(45) Date of Patent: Mar. 3, 2015

(54) ELECTRONIC DEVICE AND METHOD FOR DC-DC CONVERSION WITH VARIABLE BIAS CURRENT

(75) Inventors: Kevin Scoones, Dallas, TX (US); Gerhard Thiele, Dachau (DE); Neil Gibson, Freising (DE)

(73) Assignee: Texas Instruments Deutschland GmbH, Freising (DE)

( * ) Notice: Subject to any disclaimer, the term of this patent is extended or adjusted under 35 U.S.C. 154(b) by 421 days.

(21) Appl. No.: 12/792,919

(22) Filed: Jun. 3, 2010

(65) Prior Publication Data

US 2010/0308784 A1 Dec. 9, 2010

(30) Foreign Application Priority Data

Jun. 8, 2009 (DE) .......... 10 2009 024 159

(51) Int. Cl.
*H02M 3/157* (2006.01)
*H02M 1/32* (2007.01)
*H02M 3/158* (2006.01)
*H02M 1/00* (2006.01)

(52) U.S. Cl.
CPC ............ *H02M 3/157* (2013.01); *H02M 1/32* (2013.01); *H02M 3/1588* (2013.01); *H02M 2001/0032* (2013.01); *Y02B 70/1466* (2013.01)
USPC ....................................... 323/285

(58) Field of Classification Search
CPC ............ H02M 3/157; H02M 2001/0032; H02M 2001/0025
USPC .......... 323/282, 284, 285, 222, 223, 224, 351
See application file for complete search history.

(56) References Cited

U.S. PATENT DOCUMENTS

| 6,127,815 | A * | 10/2000 | Wilcox ........................ 323/282 |
| 6,859,020 | B2 * | 2/2005 | Baldwin et al. ............... 323/283 |
| 7,701,188 | B2 * | 4/2010 | Kojima ........................ 323/284 |
| 2003/0231012 | A1 | 12/2003 | Corva et al. |
| 2005/0017761 | A1 * | 1/2005 | Akita et al. ..................... 327/63 |
| 2007/0090816 | A1 | 4/2007 | Yang |
| 2008/0036443 | A1 | 2/2008 | Kojima |
| 2008/0224675 | A1 * | 9/2008 | Takagi .......................... 323/275 |

* cited by examiner

*Primary Examiner* — Harry Behm
*Assistant Examiner* — Matthew Grubb
(74) *Attorney, Agent, or Firm* — William B. Kempler; Frederick J. Telecky, Jr.

(57) ABSTRACT

The invention relates to an electronic device and a method for DC-DC conversion using a comparator for generating an output signal for driving a power switch of a switch mode DC-DC converter. The electronic device is configured to reduce a bias current of the comparator with a first slope in response to a decreasing load and to increase the bias current of the comparator with a second slope in response to an increasing load, wherein the second slope is steeper than the first slope.

5 Claims, 4 Drawing Sheets

ELECTRONIC DEVICE AND METHOD FOR DC-DC CONVERSION WITH VARIABLE BIAS CURRENT

CROSS-REFERENCE TO RELATED APPLICATIONS

This patent application claims priority from German Patent Application No. 10 2009 024 159.0, filed Jun. 8, 2009, which is incorporated herein by reference in its entirety.

FIELD OF THE INVENTION

The present invention relates to an electronic device and a method for switch mode DC-DC conversion with bias current control for reducing power consumption.

BACKGROUND OF THE INVENTION

Low quiescent current switch mode converters require that the bias currents in some or all sub-circuits are reduced if the load on the secondary side of the DC-DC converter decreases. A decreasing load means that the load current (or the output current) of the DC-DC converter also decreases. Low bias currents for low loads provide low quiescent currents of the DC-DC converter and therefore low power consumption. Prior art switch mode DC-DC converters tend to trigger erroneously if the bias current is changed. In order to prevent these false triggers, conventional DC-DC converters use additional circuitry. However, this additional circuitry is complex and causes additional costs.

SUMMARY OF THE INVENTION

It is a general object of the invention to provide an electronic device and a method for DC-DC conversion with reduced susceptibility to false triggers due to bias current variations.

In one aspect of the invention, an electronic device is provided which comprises a switch mode DC-DC converter. The DC-DC converter comprises a comparator for generating driving signals for driving a power switch of the switch mode DC-DC converter. The comparator can be coupled to compare an output voltage level of the DC-DC converter with a reference voltage level. The output signal of the comparator can be fed to a control stage and a gate driver for generating the driving signals for power switches. The driving signals can be pulse width modulated (PWM) signals and/or a pulse frequency modulated (PFM) signals for a respective PWM mode and PFM mode. The electronic device may then be configured to switch between a PWM mode and a PFM mode. The electronic device may be configured to operate in PWM mode for driving greater loads and in PFM mode for driving smaller loads. Furthermore, the electronic device may be configured to reduce a bias current of the comparator from a first value to a second value in response to a decreasing load. The reduction of the bias current can then be performed with a first slope. The electronic device may further be configured to increase the bias current of the comparator from the second value to the first value in response to an increasing load. Increasing the bias current is performed with a second slope. The second slope and the first slope have opposite signs, but the absolute value (or magnitude) of the second slope is advantageously steeper than the absolute value (or magnitude) of the first slope. This aspect of the invention provides a robust control of the bias current in response to changing load conditions. False triggers are avoided. The bias current can be slowly and/or gradually reduced if the load decreases. If the load increases, the change of the bias current is performed quicker than for a decreasing load. In other words, the rising slope advantageously has a greater absolute value than the falling slope. For a transient from low loads to higher loads, the bias current may instantaneously be increased to the required level. The relationship of the absolute values of the rising slope (increasing bias current) and the falling slope (decreasing bias current) may be about 10 to 1. The electronic device may be configured to resume high bias current operation within, for example a few tens of nanoseconds. The bias current may be reduced within, for example several hundreds of nanoseconds. The gradual and slow reduction of the bias current reduces the risk that the DC-DC converter changes unintentionally from one mode (PWM or PFM) to the other mode (PFM or PWM). However, the electronic device still provides a quick response for a change from low loads to high loads.

The electronic device may further be configured to generate the first slope with a transistor operating as a variable resistor. This can be implemented with a transistor having a capacitor coupled to its gate. The electronic device may be configured to generate the first slope through a charging procedure of a capacitance. The slope may then be defined through a resistor and capacitor combination with a predetermined time constant. The capacitor may also be the capacitor coupled to the control gate of the transistor. The transistor may be coupled to short out a resistor having a greater resistance value than the on resistance of the transistor. Two transistors in parallel to a resistor may then be used. One transistor may then be configured to generate the first slope and the other transistor may be configured to generate the second slope. This aspect of the invention generally relates to an analog implementation of the timing (slope) of the bias current reduction. In another embodiment, a digital implementation may be used. However, an analog circuit can be very simple and robust. This is possible since the exact timing or the exact value of the slope is not very critical. It is therefore possible to use a circuitry where a capacitance is charged through a resistance with a current of a certain magnitude. The resulting voltage on the capacitance may then be used to control the bias current reduction, i.e. the slope of the bias current reduction (first slope). Furthermore, a source follower may be used to determine the magnitude of the bias current. The resistance coupled to the source of the source follower may be varied in order to change the bias current with the first slope and/or the second slope. Furthermore, the bias current may be varied with a variable resistance. The variable resistance may be implemented with a transistor. The gate to source voltage of the transistor may be changed by a charging and/or discharging procedure of a capacitor. The capacitor may be coupled between the gate and the drain of the transistor.

The electronic device may also be configured to generate a pause signal as an indicator of whether a magnitude of an inductor current of the DC-DC converter is zero. The pause signal may be digital signal. A transition of the pause signal may then be used to start a reduction of the bias current of the comparator with the first slope.

Using a pause signal is advantageous for DC-DC converters which are configured to use a PFM mode for light loads. In PFM mode, current pulses of a predetermined length are generated through an output inductor in response to an output signal, for example an output voltage. If the output voltage falls to a preset lower voltage level, a current pulse of predetermined length through the output inductor is generated in order to increase the output voltage. The current through the output inductor can be monitored. If the inductor current is zero, a pulse signal is issued and kept on the same level, until the output voltage level anew drops below the lower voltage level.

In an aspect of the invention, the electronic device can be configured to compensate a loss of gain of the comparator, if the bias current is reduced. This provides that the comparator can operate quickly and precisely even with reduced bias currents. In an embodiment, the comparator may comprise a differential pair with a resistive load. The resistive load may be increased, when the bias current through the differential pair is decreased due to a lower load.

An aspect of the invention provides a method of operating an electronic device for DC-DC conversion. A bias current of a comparator for generating an output signal for driving a power switch of the switch mode DC-DC converter is reduced from a first value to a second value with a first slope in response to a decreasing load. The bias current of the comparator is then increased from the second value to the first value with a second slope in response to an increasing load. The second slope is steeper than the first slope.

BRIEF DESCRIPTION OF THE DRAWINGS

Further aspects of the invention will ensue from the description herein below of preferred embodiments of the invention with reference to the accompanying drawings, wherein.

DESCRIPTION OF THE EMBODIMENTS

Figure 1:
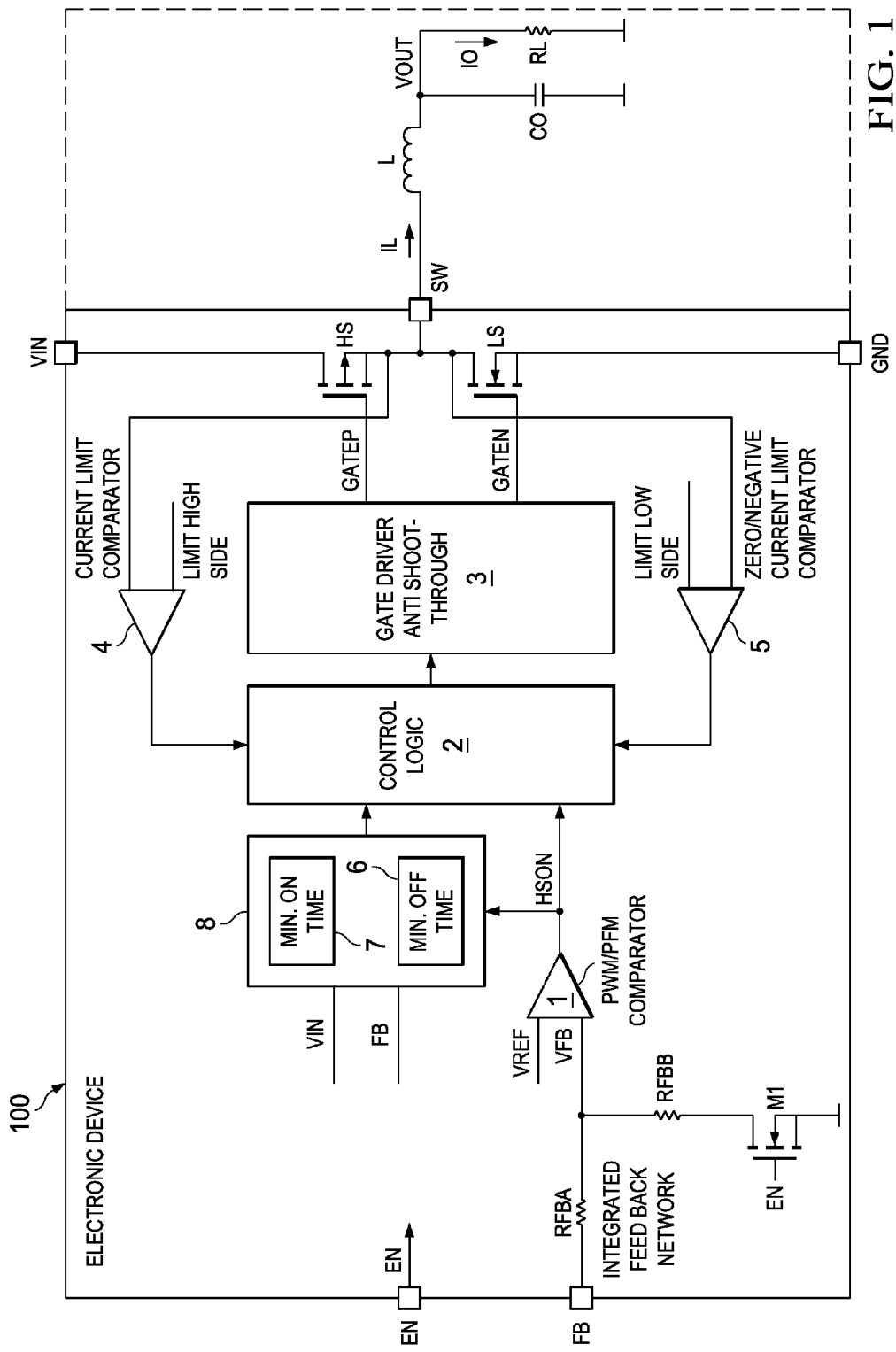
FIG. 1 is a simplified block and circuit diagram of an electronic device to which the aspects of the invention apply.

FIG. 1 shows a simplified circuit and block diagram of an electronic device 100 to which the aspects of the invention apply. The electronic device can comprise or substantially be an integrated circuit. The electronic device can be configured to perform DC-DC conversion. The solid line suggests how integrated and external components can be arranged. However, other configurations are also possible. This embodiment relates to a DC-DC converter with two power switches HS and LS. Switch HS is referred to as high side switch and implemented with a PMOS transistor. The other switch LS is referred as the low side switch and implemented with an NMOS transistor. The high side switch HS is coupled with one side of its channel to receive the primary input voltage VIN. The low side switch LS is coupled with one side of its channel to the other side of the channel of the high side switch HS. This node is the switching node SW. The other side of the channel of the low side switch is coupled to ground GND. An inductor L is coupled with one side to the switching node SW. By switching the power switches LS and HS, a secondary output voltage VOUT is generated at the other side of the inductor L. The output voltage VOUT is buffered with a capacitor CO. The resistor RL represents a load, which is fed with a load current IO. The load RL may have any impedance. In particular, the load RL can vary. A low load RL (also referred to as light load) consumes only a small current IO. A great load (also referred to as heavy load) consumes a large current IO.

The high side switch HS, and the low side switch LS are basically alternately switched on and off by driving signals GATEP and GATEN, respectively. In response to the switching of the power switches HS, LS, a current IL is fed to the output node VOUT and a corresponding charge is buffered on capacitor CO for providing the output current IO.

The driving signals GATEP and GATEN for the power switches are controlled through one or more feedback loops. One of these feedback loops comprises PWM/PFM comparator 1. The comparator 1 receives a reference signal VREF at one input and a feedback signal VFB at the other input. The feedback signal VFB can be derived through a resistive divider RFBA, RFBB (only an illustrative example) from the output voltage level VOUT and/or the voltage level at switching node SW. The comparator 1 serves to monitor the output voltage VOUT. If the output voltage drops below a low threshold voltage (set with VREF), the comparator 1 changes a respective output signal HSON, which indicates that the output node needs to be charged. The comparator output signal HSON is fed to a control stage 2, which also receives other configuration and/or feedback signals and generates control signals for the gate drive 3. The gate driver basically includes buffer stages and/or inverters for generating the gate driving signals GATEP and GATEN for the high side and the low side switch HS, LS.

The control stage 2 also receives signals from current limit comparators 4 and 5 which monitor the maximum currents through the high side switch HS and the low side switch LS, respectively.

In a practical implementation, the electronic device 100 may have several tens of pins. Only some of these pins are shown, as for example an enable pin EN and the feedback pin FB. There is further a pin VIN for the input voltage and a ground pin GND as well as the switching pin SW. Through the enable pin EN, the feedback loop including comparator 1 can be enabled by turning transistor M1 on. In PFM mode, the power switch HS is controlled so as to open for a basically fixed period of time. The frequency of these current bursts or ON-pulses is then controlled through various feedback mechanisms. In PWM mode, only the duty cycle of pulses of a constant clock period or clock frequency is varied in response to the feedback signals. This can cause currents to flow the negative direction through the inductor. This can be avoided, if the electronic device, i.e. the DC-DC converter automatically changes from PWM mode to PFM mode, if the current through the inductor becomes zero.

Figure 2:
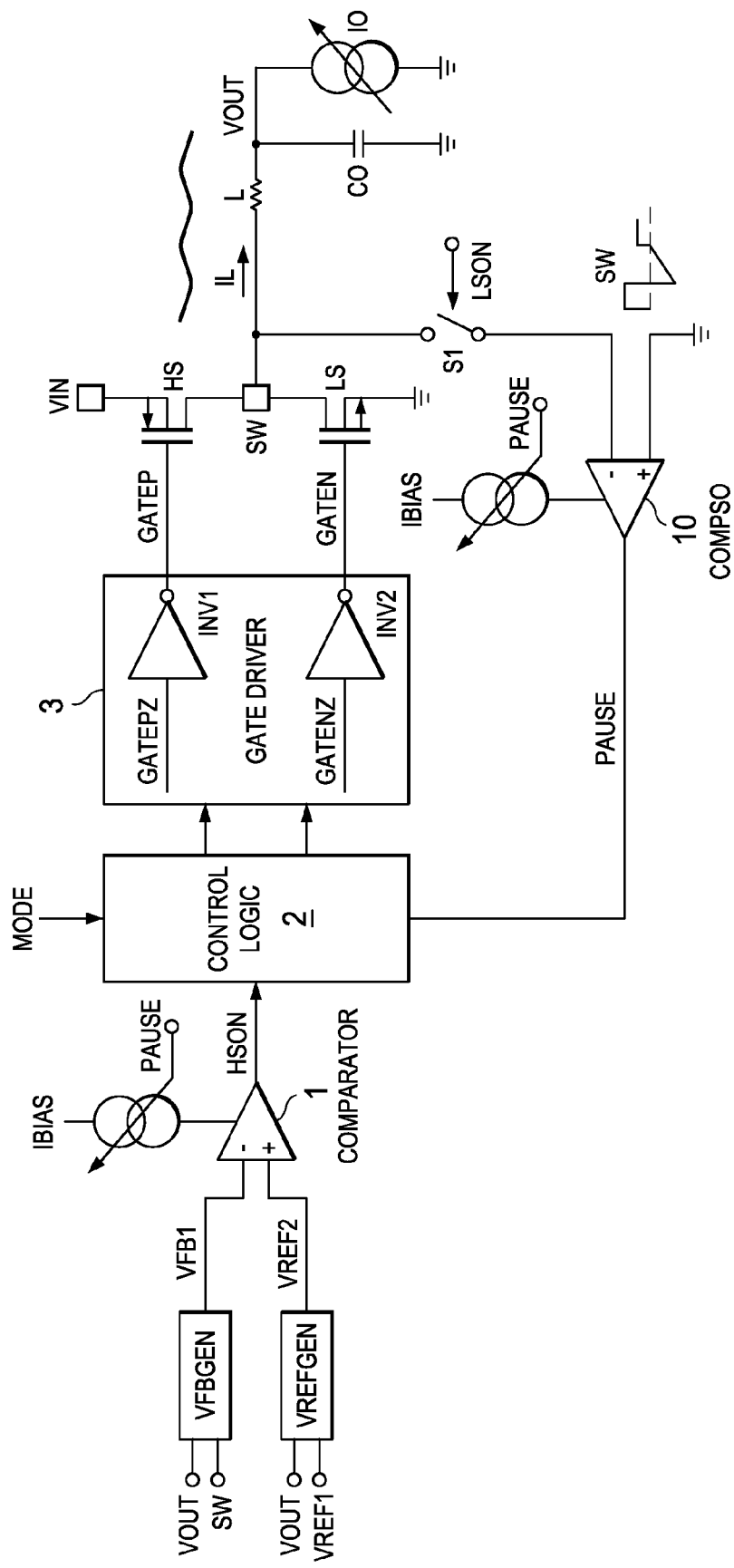
FIG. 2 is a detailed simplified circuit diagram of an embodiment of the invention.

FIG. 2 shows a simplified circuit and block diagram of an embodiment of the invention. Most stages and components of the embodiment can be similar to those shown and explained with respect to FIG. 1. However, FIG. 2 shows more details with respect to various aspects of the invention. Signals with a Z at the end are the inverted signals of the signals without a Z. PAUSEZ is the inverted digital signal PAUSE. GATEPZ is the inverted signal GATEP.

Comparator 1 is used for feedback control of the gate driving signals. It is supplied with a variable bias current IBIAS. The bias current IBIAS is controlled in accordance with aspects of the invention. The input voltage VFB1 at the negative input of comparator 1 can be a function of the voltage level at switching node SW and/or the output voltage VOUT. The reference voltage level VREF2 at the positive input of comparator 1 can be a function of the state of the driving signal GATEP of the high side switch HS, the output voltage level VOUT, and/or a preset reference voltage VREF1. Stages VFBGEN and VREFGEN include the necessary components for generating signals VREF2 and VFB1 in response to the respective signals VOUT, SW and/or VIN.

Comparator 1 provides an output signal HSON, which is the comparison result of input signals VFB1 and VREF2. Comparator output signal HSON is fed to control stage 2. In response to the comparator output signal HSON and various other signals, control stage 2 issues control signals to gate driver 3. Gate driver 3 includes two buffers (inverters in this embodiment) INV1, INV2. The buffers INV1, INV2 receive input signals GATEPZ, GATENZ and provide inverted gate driving signals GATEP and GATEN at their respective outputs for driving the control gates of the high side switch HS and the low side switch LS. Node SW is the node between the channels of the power switches. This node SW is pulled up to the input voltage level VIN or down to ground GND when the respective switch is open. Accordingly, a current IL is generated through inductor L, which is also coupled with one side to switching pin SW. Current IL rises and falls basically linearly. The buffer capacitor CO is charged and a respective output voltage VOUT is provided at the output node. The load is represented by a variable current source IO. The load may vary from low to high or from high to low, which means that the load current IO rises or falls. For rather light loads, the current IO may become so small that temporarily no current IL is required for recharging CO. This means that the inductor current can become zero and even flow in reverse direction. However, this is usually undesired and the DC-DC converter should change from PWM mode to PFM mode. In PFM mode, it is possible to further reduce the overall power consumption by reducing the various bias currents IBIAS of the multiple stages (e.g. comparator 1, comparator 11, comparator 10, stage 6) in order to reduce the internal quiescent currents.

In order to detect the point of time, when the current IL becomes zero, there is a current sensing stage, including another comparator COMPI0 10. This comparator COMPI0 10 can be coupled with a negative input through switch 51 to switching node SW for sensing the voltage level at pin SW. The switch is only closed (i.e. connecting) if the low side switch LS is on, i.e. signal LSON is high. The positive input of comparator 10 is coupled to ground GND. The behavior of the voltage at switching node SW is illustrated at the comparator input. The voltage on pin SW is at ground, if the current IL through the inductor is zero. This means that the voltage on switching pin SW can be used for determining the point of time when the current IL through the inductor becomes zero. If the magnitude of the current IL through the inductor L becomes zero, the output signal PAUSE of comparator COMPI0 changes from low to high. The pause signal PAUSE is used for timing the bias current reduction according to aspects of the invention. If the pause signal PAUSE changes from low to high, this is an appropriate moment for reducing power consumption of the circuit. The pause signal is fed to various stages of the electronic device 100, as for example to comparator 1, a comparator COMPON 11 and timing stage 6. Even the bias current IBIAS of comparator COMPI0 10 is controlled with pause signal PAUSE.

For comparator 1, the pause signal PAUSE only indicates the beginning and the end of the phase during which the bias current IBIAS can be reduced. An embodiment of a comparator 1 is shown in more detail in FIG. 4 and will be described later. Comparator 1 includes the respective circuitry for gradually reducing the bias current during bias current reduction and for immediately increasing the current if the load increases.

Figure 3:
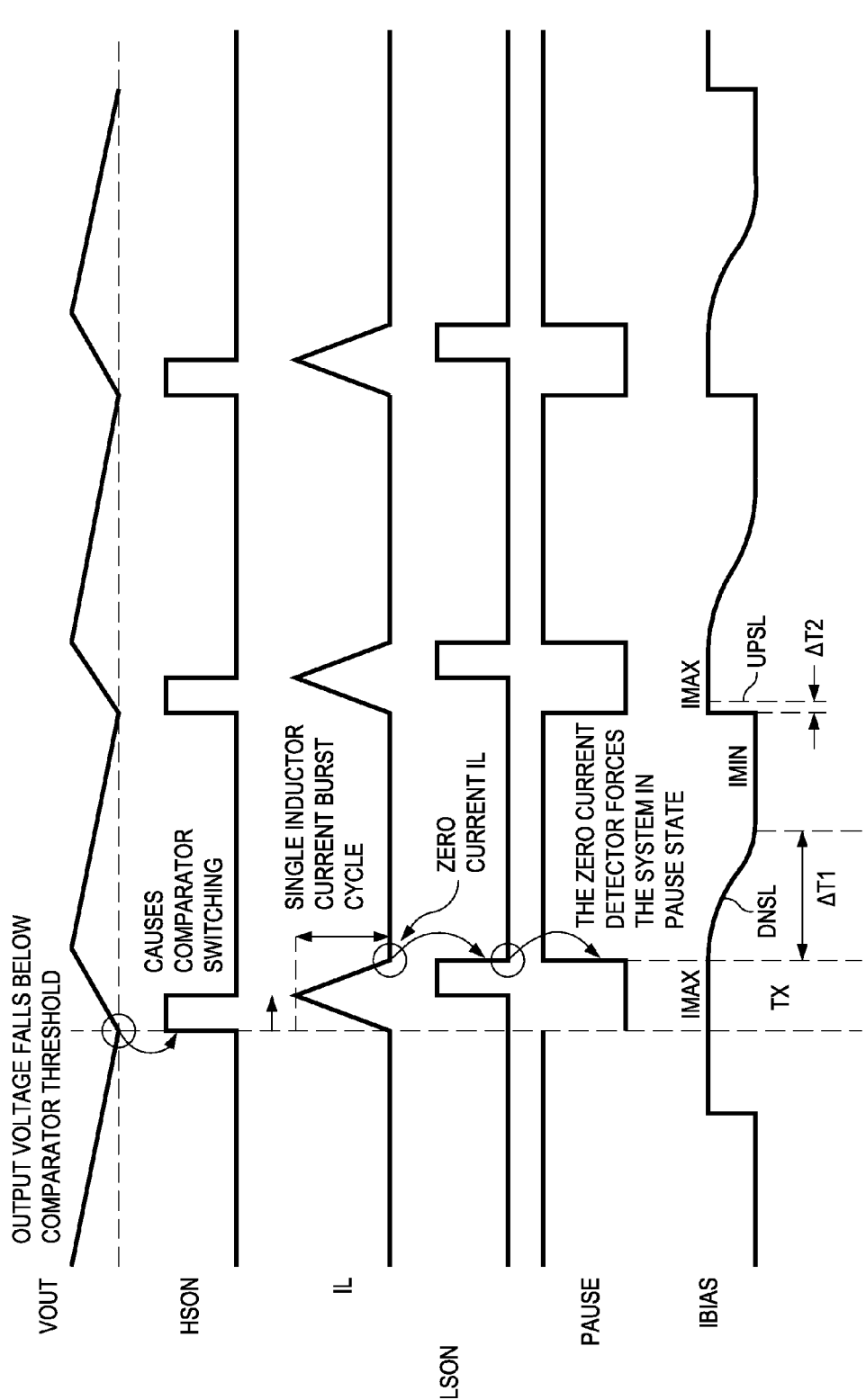
FIG. 3 is a diagram showing waveforms of signals of the embodiment of FIG. 2.

FIG. 3 shows waveforms relating to aspects of the invention. If the output voltage VOUT falls below a lower threshold voltage level (dashed line), the comparator 1 changes its output signal HSON from low to high. This provides that the high side switch HS is switched on. The current IL through the inductor rises basically linearly. If the magnitude of the current IL reaches a maximum value, the high side switch HS is turned off. The magnitude of the current IL falls basically linearly and reaches zero. If IL reaches its maximum, also the low side switch LS is turned on. This is indicated with a high pulse of signal LSON. The moment when the current IL reaches zero is detected with zero current comparator 10 in FIG. 2. Accordingly, the pause signal PAUSE, which is the output signal of the comparator 10, switches from low to high. The transition of the pause signal PAUSE from low to high at time TX indicates that PFM mode can be entered and that the bias currents IBIAS of various stages including comparator 1 can be reduced. The bias current IBIAS starts at time TX with a maximum magnitude IMAX and falls gradually with a falling slope DNSL until the minimum bias current magnitude IMIN is reached. Basically at the same time TX, the output voltage VOUT begins to decrease due to an output current IO consumed by a load coupled to the output node VOUT. Dependent on the current consumption of the load and the capacitance value of capacitor C0, the output voltage decreases more or less quickly. If the output voltage VOUT reaches the lower threshold VREF2, the pause signal PAUSE changes from high to low, and another current pulse of current IL is issued. In response to a change from high to low of pause signal PAUSE, the bias current IBIAS is immediately increased with a rising slope UPSL, which is much steeper than the falling slope DNSL. The change of bias current can be defined as $\Delta$IBIAS, i.e. the difference of the first value being the maximum bias current IMAX and the second value being the minimum bias current IMIN ($\Delta$IBIAS=IMAX−IMIN). Furthermore, the time required to reduce the bias current can be a first period of time $\Delta T1$. The time for increasing the bias current can then be a second period of time $\Delta T2$. The first period of time $\Delta T1$ can then be greater than the second period of time $\Delta T2$. The first period of time $\Delta T1$ can be ten times or more greater than the second period of time $\Delta T2$. The first period of time can be several hundreds of nanoseconds. The second period of time can be several tens of nanoseconds. The first slope can then be defined as $\Delta$IBIAS/$\Delta T1$. The second slope can then be defined as $\Delta$IBIAS/$\Delta T2$. For $\Delta T1=k*\Delta T2$, k should be greater than 1 and advantageously greater than 5 or greater than 10. The instantaneous change of the current may vary during the first period of time $\Delta T1$. The instantaneous change may also vary during the second period of time $\Delta T2$. The ratios given in this description do not relate to the instantaneous slopes within the first period of time and the second period of time at specific points of time. The change of current from maximum bias current to minimum bias current is slower than the change of bias current from minimum bias current to maximum bias current.

Figure 4:
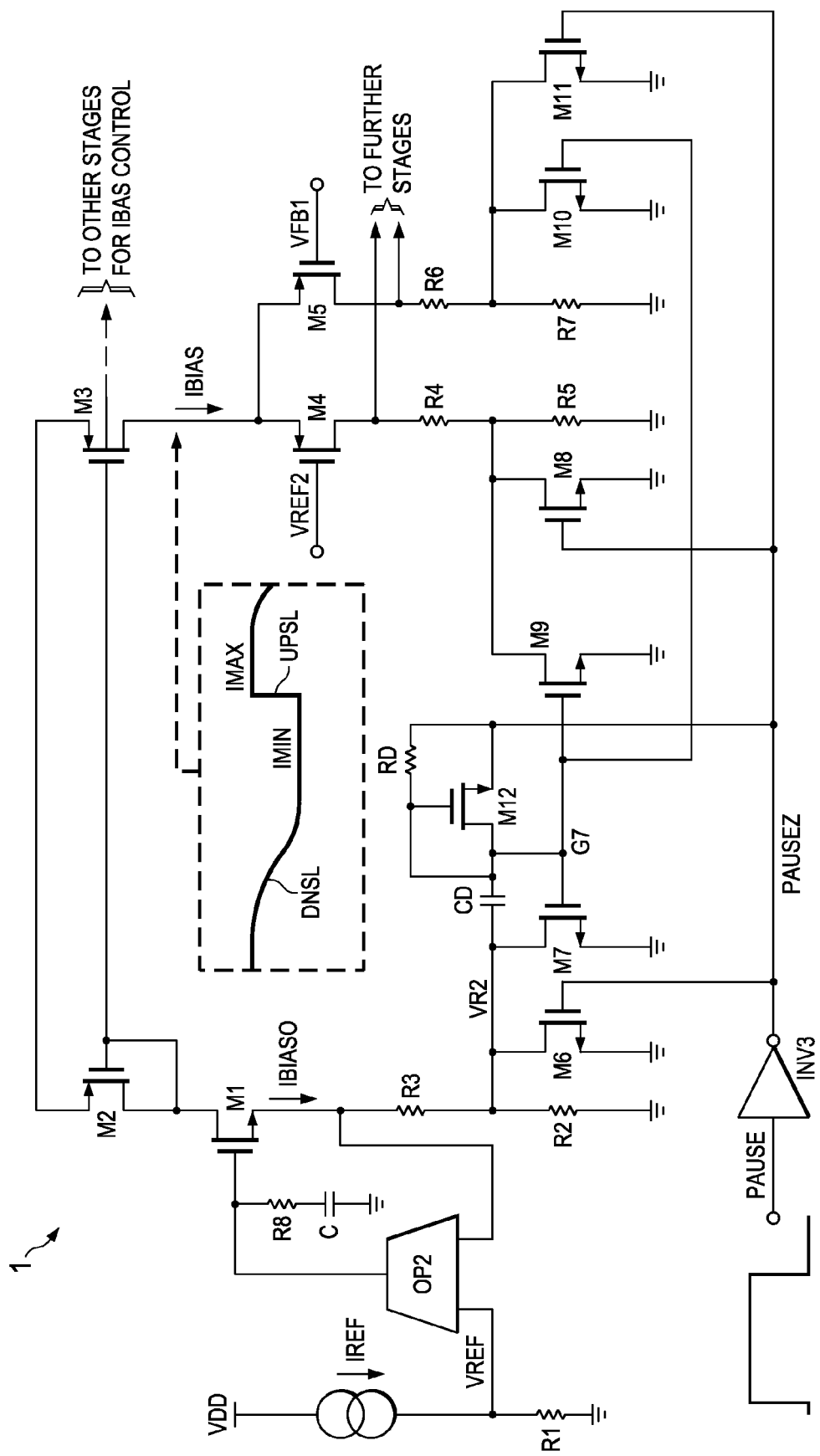
FIG. 4 shows a simplified circuit diagram of an embodiment of a comparator according to aspects of the invention.

FIG. 4 shows a simplified circuit diagram of an embodiment of a comparator 1 according to aspects of the invention. In this embodiment, the comparator 1 comprises a differential pair of PMOS transistors M4, M5. The control gates of the differential pair M4, M5 are the respective positive and negative inputs of the comparator. The positive input (control gate of M4) receives the reference voltage VREF2. The negative input receives the feedback voltage VFB1, which is derived from the output voltage. The differential pair M4, M5 is coupled to a resistive load including resistors R4, R5, R6 and R7, which can be configured through transistors M8, M9, M10 and M11. The differential pair is coupled to current source for receiving the bias current IBIAS. The current source includes a current mirror of transistors M3 and M2. The current IBIAS0 through the channel of transistor M2 is mirrored to the channel of transistor M3, which supplies a proportional current IBIAS to the differential pair. Dependent on the dimensions of the current mirror M2, M3 currents IBIAS0 and IBIAS can have the same magnitude.

The magnitude of the bias current IBIAS is controlled by the pause signal PAUSE, which is generated as described above and analog circuitry including various resistors R1, R2, R3, RD and R8, transistors M1, M6, M7, M12, an amplifier OP2, a reference current source IREF, and capacitors CD and C.

The current source IREF is coupled to resistor R1 and feeds a current IREF to resistor. This provides a voltage VREF across resistor R1, which is fed with amplifier OP2 to the control gate of transistor M1. OP2 is coupled as voltage follower. R8 and C serve to buffer the control voltage at the gate of transistor M1. Resistors R3, R2 are coupled in series to the source of transistor M1 and receive current IBIAS0 which is derived from the reference current IREF through the voltage follower OP2. Transistor M1 operates as a source follower. This means that the current IBIAS0 through the channel of transistor M1 is a function of the voltage drop across resistors R2 and R3. The resistance of R2 is modified with transistors M6 and M7. This changes the voltage level on node VR2. Transistor M6 serves to provide a sudden increase of the bias current IBIAS for rising loads. Transistor M6 is responsible for the rising slope UPSL. Transistor M7 operates similar to a variable resistor which is controlled with RC element RD, CD, diode coupled transistor M12 and the pause signal PAUSE.

The pause signal PAUSE is fed to an input of an inverter INV3. The output of inverter INV3 provides the inverted pause signal PAUSEZ. The output of inverter INV3 is coupled to the control gates of transistors M6 through M11. The output of inverter INV3 is also coupled to an RC element including the capacitor CD and the resistor RD. There is also a diode coupled transistor M12 in parallel to resistor RD. The diode coupled transistor M12 limits the voltage on node G7. The diode coupled transistor M12 is coupled between one side of capacitor CD which is also connected to the control gate of transistor M7. The other side of the diode coupled transistor M12 is coupled to the output of inverter INV3, so as to receive signal PAUSEZ. The diode coupled transistor M12 is forward biased from node G7 (i.e. the control gate of transistor M7) to the output of inverter INV3 (i.e. PAUSEZ).

If the pause signal PAUSE is low, signal PAUSEZ is high. This provides that transistor M6 is turned on and resistor R2 is basically shorted out. The remaining resistance on the source of transistor M1 is substantially defined by resistor R3 and the bias current IBIAS is at the maximum level IMAX.

If the pause signal PAUSE changes from low to high, the voltage level at the output of inverter INV3 (signal PAUSEZ) changes from high to low. Transistor M6 is suddenly turned off, but transistor M7 is already open and provides that the bias current IBIAS does not change immediately. In an aspect of the invention, the ON resistance of transistors M6 and M7 are lower than the resistance value of resistor R2, which is to be shorted out by the transistors M6, M7. This provides that turning off M6, while M7 is on, does not cause a sudden change of the bias current. Transistors M6 and M7 can be turned on at the same time. Capacitor CD is coupled between the gate and the drain of transistor M7. The capacitor CD is slowly and gradually charged and the drain to gate voltage of transistor M7 increases. The voltage level on node G7 decreases. This provides that transistor M7 is slowly and gradually turned off. The voltage level on node VR2 increases. The final resistance at node VR2 is finally dominated by resistor R2 and the total resistance on the source of transistor is the series resistance of R2 and R3. This is the maximum resistance and the current IBIAS is at its minimum level IMIN. Transistor M7 operates as a variable resistance.

If the pause signal PAUSE changes again from high to low, transistor M6 is turned on and the bias current resumes its maximum level IMAX immediately. The period of time required for rising the bias current from IMIN to IMAX may be several tens of nanosecond. The period of time required for decreasing the bias current from IMAX to IMIN may be several hundreds of nanoseconds.

Furthermore, the gain of the comparator is also substantially maintained in accordance with the variation of the bias currents. This is performed through load resistors R4 to R6 and transistors M8 to M11, the pause signal PAUSE and the voltage level on node G7, which is the gate voltage of transistor M7.

Transistors M8 to M11 are coupled with their channels in parallel to resistors R5 and R7, which are the respective load resistors of the sides of the differential pair. Similar to the operation of transistors M6 and M7, transistors M8 and M11 are turned on, if the pause signal PAUSE is low (PAUSEZ is high). If PAUSE transitions from low to high, transistors M8 and M11 are turned off. However, transistors M9 and M10 are already turned on, and the resistive load of differential pair M4, M5 remains unchanged. In an aspect of the invention, the ON resistance of transistors M9 and M10 and M8 and M11 are all lower than the resistance values of the resistive load resistors R5, R7, which are to be shorted out by the transistors M8, M9, M10, M11. This provides that turning off M8 and M11, while M9 and M10 are on, does not cause a sudden change of the output signal. As previously explained, the voltage level at node G7 decreases slowly while capacitor CD is charged. This provides that M9 and M10 are slowly and gradually turned off. The resistive load of the comparator increases and the gain of the comparator is substantially maintained as IBIAS is reduced. If signal PAUSEZ changes from low to high, transistors M8, M11 are turned on, and transistors M9, M11 remain off. The behavior of the load resistance of the comparator is therefore similar but antiproportional to the magnitude of the bias current IBIAS. A loss of transconductance of the comparator is compensated through a variation of the resistive load of the differential pair.

The invention provides electronic devices and methods for reducing power consumption without complex control logic. It also removes output voltage disturbances if the DC-DC converter switches between PWM and PFM mode. The pause signal PAUSE provides sufficient information about the load current. If the inductor current IL drops to or below zero, the pause signal PAUSE changes from low to high. The period of time during which the pause signal remains high depends on the load current magnitude. For light loads, the pause signal remains longer at logic high than for heavier loads. The circuit generating the bias current can be included in the comparator. It can use a constant reference current and derive a variable bias current from this reference current. The bias current can then be a function of the pause signal and the load current. The pause signal indicates the moment, when the DC-DC converter can enter a PFM mode. This provides higher efficiency. The bias current can then be reduced over several hundreds of nanoseconds to about one tenth of the maximum bias current.

The invention provides an electronic device for DC-DC conversion with very low quiescent currents and fast load transient behavior. The bias current of other stages of the electronic device may be reduces and increased according to aspects of the invention.

Although the present invention has been described in detail, it should be understood that various changes, substitutions and alterations can be made hereto without departing from the spirit and scope of the invention as defined by the appended claims.

The invention claimed is:

1. An electronic device comprising a switch mode DC-DC converter comprising a comparator for generating one of a pulse width modulated (PWM) or pulse frequency modulated (PFM) output signal for driving a power switch of the switch mode DC-DC converter, the electronic device being configured to reduce a bias current of the comparator independent of a voltage control loop of the converter from a first value to a second value wherein speed at which the bias current is reduced is fixed in time to generate a change over several cycles of the converter and with a first slope in response to a load current decreasing to substantially zero and to increase the bias current of the comparator from the second value to the first value time wherein speed at which the bias current is increased is fixed in time with a second slope in response to the load current increasing from substantially zero, wherein the second slope is steeper than the first slope, and wherein the comparator operates at a low bias when inductor current is substantially zero and at a higher bias when the inductor current exceeds zero in order to operate at maximum speed and being further configured to generate a pause signal as an indicator of whether a magnitude of an inductor current of the DC-DC converter is zero, wherein a transition of the pause signal is used to start a reduction of the bias current of the comparator with the first slope.

2. The electronic device according to claim 1, being further configured to generate the first slope with a transistor configured to operate as a variable resistor.

3. The electronic device according to claim 2, being configured to compensate a loss of gain of the comparator if the bias current is reduced.

4. The electronic device according to claim 1, being configured to compensate a loss of gain of the comparator if the bias current is reduced.

5. A method of operating an electronic device comprising for switch mode DC-DC conversion, the method comprising: reducing a bias current of comparator independent of a voltage control loop of the converter for generating one of a pulse width modulated (PWM) or pulse frequency modulated (PFM) output signal for driving a power switch of the switch mode DC-DC converter from a first value to a second value wherein speed at which the bias current is reduced is fixed in time to generate a change over several cycles of the converter with a first slope in response to a load current decreasing to substantially zero, and increasing the bias current of the comparator from the second value to the first value wherein speed at which the bias current is increased is fixed in time with a second slope in response to the load current increasing from substantially zero, wherein the second slope is steeper than the first slope and, wherein the comparator operates at a low bias when inductor current is substantially zero and at a higher bias when the inductor current exceeds zero in order to operate at maximum speed, further comprising generating a pause signal as an indicator of whether a magnitude of an inductor current of the DC-DC converter is zero, wherein a transition of the pause signal is used to start a reduction of the bias current of the comparator with the first slope.

* * * * *